(12) United States Patent
Dawson et al.

(10) Patent No.: US 8,553,700 B1
(45) Date of Patent: Oct. 8, 2013

(54) METHOD AND SYSTEM FOR FACILITATING PACKET-BASED COMMUNICATIONS

(75) Inventors: Travis Edward Dawson, San Francisco, CA (US); Mark Evans, San Mateo, CA (US); Jay Cee Straley, Burlingame, CA (US); John Nathan Larson, Palo Alto, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 640 days.

(21) Appl. No.: 12/626,509

(22) Filed: Nov. 25, 2009

Related U.S. Application Data

(63) Continuation of application No. 11/003,816, filed on Dec. 2, 2004, now Pat. No. 7,681,038.

(51) Int. Cl.
*H04L 12/56* (2006.01)

(52) U.S. Cl.
USPC ........................................................ 370/395.2

(58) Field of Classification Search
None
See application file for complete search history.

(56) References Cited

U.S. PATENT DOCUMENTS

| 7,184,418 | B1 * | 2/2007 | Baba et al. | 370/331 |
| 2003/0217165 | A1 * | 11/2003 | Buch et al. | 709/229 |
| 2004/0105433 | A1 * | 6/2004 | Seo | 370/352 |
| 2006/0026288 | A1 * | 2/2006 | Acharya et al. | 709/227 |

* cited by examiner

*Primary Examiner* — Yong Zhou

(57) ABSTRACT

A method, system, and medium are provided for facilitating a communications call. The method comprises receiving a request to connect to a destination described by a first target which includes a user-identification parameter and a domain parameter. Second, using the target, generating a second target associated with the first target. Finally, permitting the request to be fulfilled if the request is associated with the second target.

14 Claims, 10 Drawing Sheets

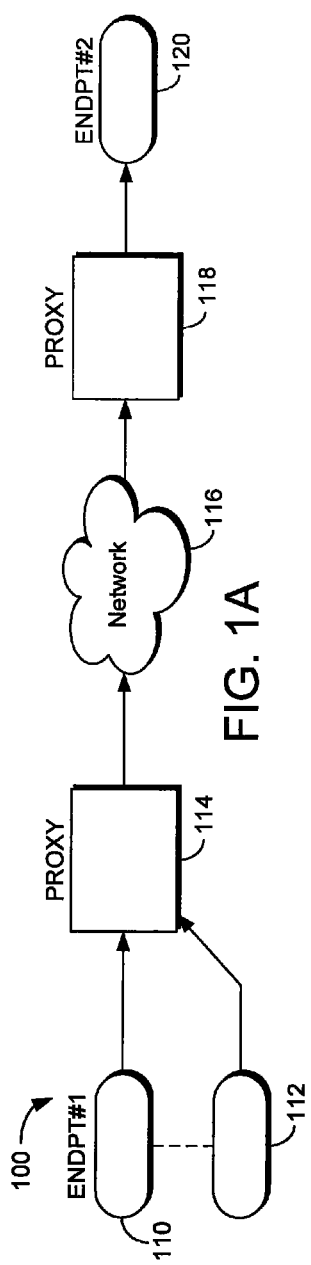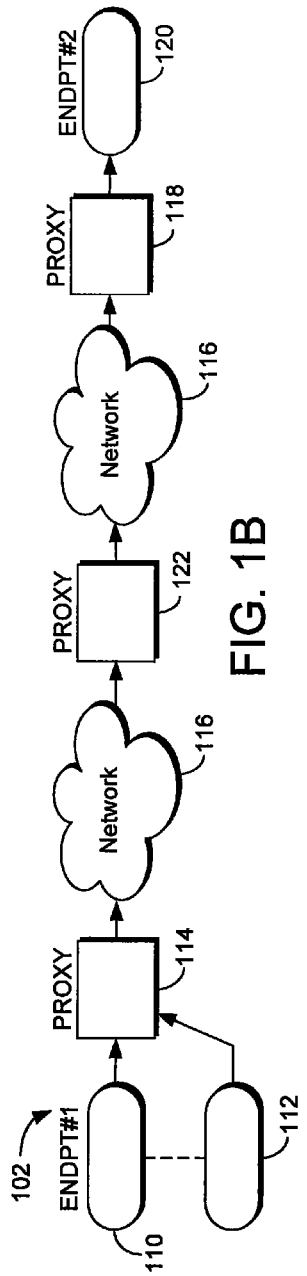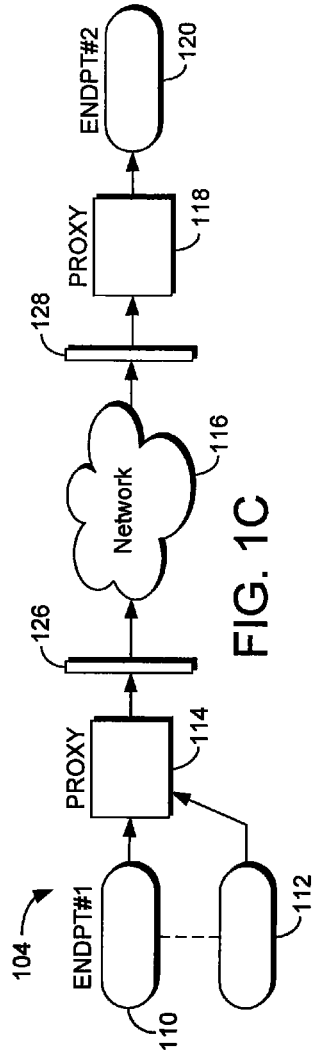

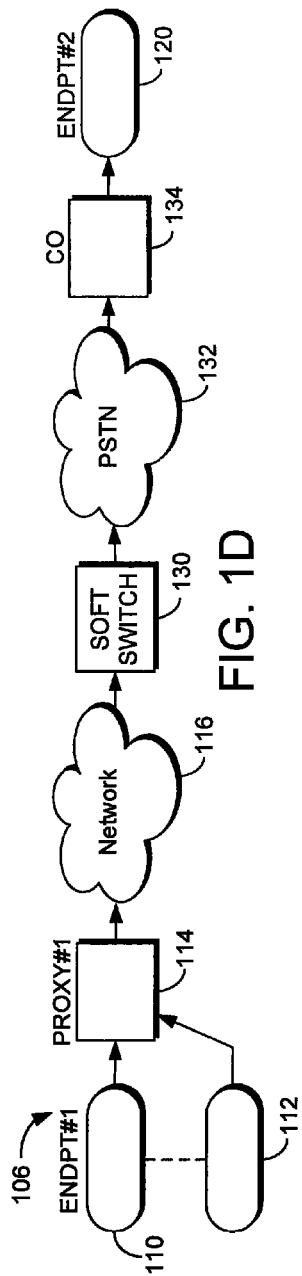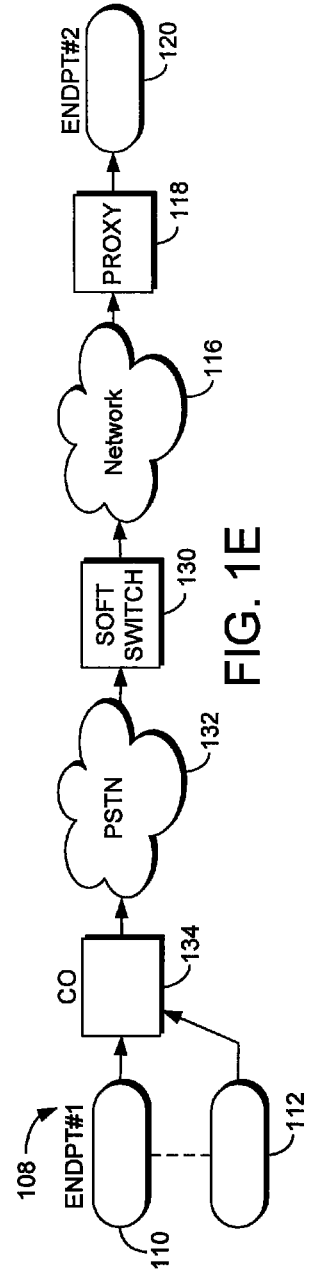

416:

416a — INVITE sip:3111100@voip-
network.net:5060;user=phone SIP/2.0
416g — Via: SIP/2.0/UDP client.com:5060
416c — From: "36601"<sip:36601@client.com>
416b — To: <sip:3111100@voip-
network.net;user=phone>
Date: Mon, 01 Mar 1993 00:40:08 GMT65
416e — Call-ID: 232226D2-14F411CC-80279792-
19DC655A@client.com
User-Agent: Cisco-SIPGateway/IOS-12.x
416d — CSeq: 101 INVITE
416f — Max-Forwards: 6
Timestamp: 730946408
416h — Contact:
<sip:36601@client.com:5060;user=phone>
Expires: 180

422:

ACK sip:3111100@voip-
network.net:5060;user=phone SIP/
Via: SIP/2.0/UDP client.com:5060
From: "36601"<sip:36601@client.com>
To: <sip:3111100@voip-
network.net;user=phone>
Date: Mon, 01 Mar 1993 00:40:08 GMT
Call-ID: 232226D2-14F411CC-
80279792-19DC655A@client.
Max-Forwards: 6
CSeq: 101 ACK

420:

420a — SIP/2.0 302 Moved Temporarily
420g — Via: SIP/2.0/UDP client.com:5060
420c — From: "36601"<sip:36601@client.com>
420b — To: <sip:3111100@voip-
network.net;user=phone>
Date: Mon, 01 Mar 1993 00:40:08 GMT
420e — Call-ID: 232226D2-14F411CC-80279792-
19DC655A@client.com
User-Agent: Cisco-SIPGateway/IOS-12.x
420d — CSeq: 101 INVITE
420h — Contact: Anonymous <sip:3111100@voip-
network.net;hash=JS74H2602JV82674J>

424, 428:

INVITE sip:3111100@voip-
network.net;hash=JS74H2602JV82674J SIP/2.0
Via: SIP/2.0/UDP client.com:5060
From: "36601"<sip:36601@client.com>
To: <sip:3111100@voip-network.net;user=phone>
Date: Mon, 01 Mar 1993 00:40:08 GMT
Call-ID: 23704587-14F411CC-80289792-
19DC655A@client.com
User-Agent: Cisco-SIPGateway/IOS-12.x
CSeq: 101 INVITE
Max-Forwards: 6
Timestamp: 730946408
Contact: <sip:36601@client.com:5060;user=phone>
Expires: 180

FIG. 5

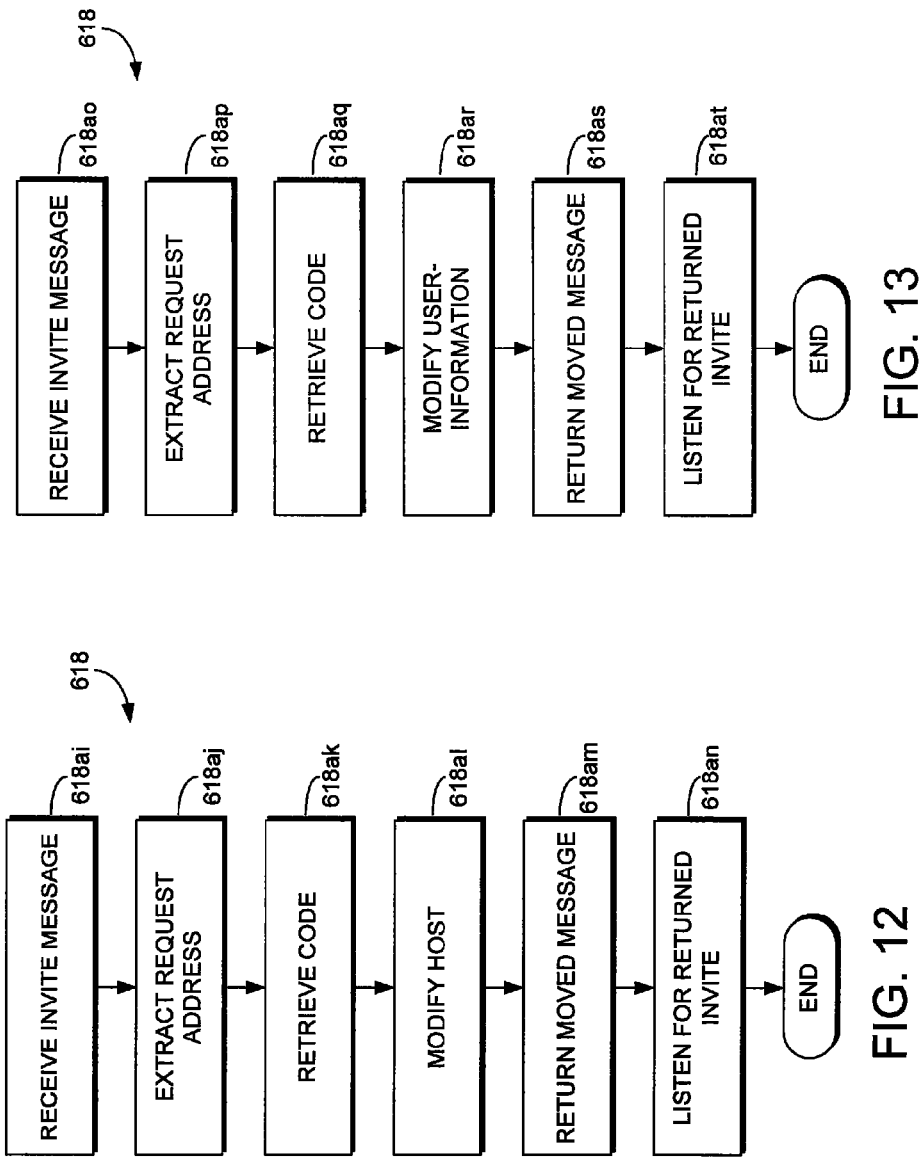

METHOD AND SYSTEM FOR FACILITATING PACKET-BASED COMMUNICATIONS

CROSS-REFERENCE TO RELATED APPLICATIONS

This application is a continuation of U.S. patent application Ser. No. 11/003,816, filed Dec. 2, 2004, which is titled METHOD AND SYSTEM FOR FACILITATING PACKET-BASED COMMUNICATIONS, and is hereby incorporated by reference in its entirety.

STATEMENT REGARDING FEDERALLY SPONSORED RESEARCH OR DEVELOPMENT

Not applicable.

BACKGROUND OF THE INVENTION

SESSION INITIATION PROTOCOL (SIP) is an emerging standard to facilitate voice over packet (VoP) technologies. VoP is a process of sending voice or video signals over the Internet or other communications networks, such as intranets. If the telephone signal is in analog form (voice or fax), the signal is first converted to a digital form. Packet-routing information is then added to the digital voice signal so the voice signal can be routed through the Internet or other data networks. Moreover, SIP can be used in instant-messaging (IM) or other real-time collaboration applications and in "presence" applications, such as "buddy lists."

SIP may work in concert with other protocols and is involved in the signaling portion of a communication session. SIP acts as the carrier for Session Description Protocol (SDP), which describes the media content of a session. SDP describes, for example, what IP ports to use and the codec being used during a particular session. In typical use, SIP sessions are control sessions for packet streams of Realtime Transport Protocol (RTP). RTP is the carrier for the actual voice or video content in itself.

SIP-compliant services are still immature in many ways. As a result, the tools and techniques that have been developed over the years to secure and protect many other IP based services have not yet become available to SIP-compliant services. So while SIP-compliant services inherit many of the vulnerabilities of being an IP based service, few protections afforded other IP based services are enjoyed. One issue that is not adequately addressed within the art concerns denial of service attacks (DOS). One exemplary DOS attack utilizes a hostile machine creating forged (spoofed) messages that appear to originate from legitimate senders. The hostile machine sends the spoofed messages to a targeted destination. With a sufficiently large number of spoofed messages, the target's phone (or data) services become clogged and rendered inoperable. Although the SIP standard does specify a method for authenticating messages, the built-in authentication mechanisms are not generally used because they are costly in terms of processing power required and can cause additional problems such as increased call set up times.

A successful DOS attack may result in crashing a particular SIP element. When dealing with a phone, the phone may no longer accepts user input and no longer be unusable. Furthermore, the SIP element may enter a reboot cycle as a result of the DOS attack and/or the element may require manual intervention to bring the element back online. Successful DOS attacks may also result in the inability of the element to process additional calls since the element is flooded with malicious SIP messages and cannot process valid messages.

Thus, the DOS attack makes service unavailable to legitimate users, who will typically experience a busy signal or "dead air." Finally, a successful DOS attack often results in degradation in the voice quality of the service. This degradation is due, in part, to a decrease in available band-width and processor resources. Voice quality can be measured by a Mean Opinion Score (MOS) and typical DOS attacks may result in a decreased MOS from acceptable to unacceptable, where 2.5 is considered the minimum acceptable MOS.

SUMMARY

The present invention solves at least the above problems by providing a system and method for validating messages. The present invention has several practical applications in the technical arts including decreasing network downtime because a lesser portion of the network is affected by malicious attacks. Further, by preventing malicious attacks, increasing overall voice quality over the network.

In one embodiment, the present invention provides a method for facilitating a packet-based communications call, comprising, first, receiving a request to connect to a destination described by a first target, the first target including a user-identification parameter and a domain parameter. Second, using the target, generating a second target associated with the first target. Finally, permitting the request to be fulfilled if the request is associated with the second target.

In another embodiment, the present invention provides a method for communicating data using a text-based protocol, comprising, first, receiving a request to communicate data to a destination address including a user-identification parameter and a domain parameter. Second, generating a string without user interaction that is associated with the destination address. Finally, permitting the request to be fulfilled if the request is verified to be associated with the string.

In still another embodiment, the present invention provides a method for communicating data using a text-based protocol. The method comprises, first, receiving a request to communicate data to an original destination address which includes a user-identification parameter and a domain parameter. Second, deriving a modified address that is associated with the original destination address. Finally, permitting the request to be fulfilled if it is verified to be associated with the original destination request.

In yet another embodiment, the present invention provides a method for validating messages using a text-based protocol that establishes, modifies or terminates multimedia sessions in a telecommunications system having end-points compliant with the text-based protocol communicating with endpoints compliant with the text-based protocol. The method comprises receiving at end-points text based-initiation messages from an initiating party. The structure of each session initiation message includes a target identifier and a call identifier. Next, based on the call identifier, indicating whether each session initiation message is an initial message or redirected message. If the message is an initial message, then appending a portion of the initial message target identifier and returning to the initiating party a redirect message having the appended portion of the initial message target identifier. If the session initiation message is a redirected message, then determining whether the redirected message includes the appended portion of the corresponding initial message target identifier, and, based on the determination, forwarding the redirected message to a proper endpoint.

In still yet another embodiment, a method is provided for validating messages using a text-based protocol that establishes, modifies or terminates multimedia sessions in a telecommunications system having end-points communicating with other endpoints compliant with said text-based protocol. This method comprises, first, receiving at the end-points session initiation messages from an initiating party. The structure of each session initiation message includes a target identifier and a call identifier. Second, based on the call identifier, indicating whether each session initiation message is an initial message or a redirected message. If the message is an initial message, then generating a new target identifier associated with the initial message target identifier and returning to the initiating party a redirect message having the new target identifier. If the session initiation message is a redirected message having the new target identifier associated with the initial message target identifier, then the redirected message is forwarded to a receiving party.

In yet still another embodiment a method is provided for validating messages using a text-based protocol that establishes, modifies or terminates multimedia sessions in a telecommunications system having text-based compliant end-points communicating with other text-based compliant endpoints. The method comprises receiving at one of the endpoints session initiation messages from an initiating party. The structure of each session initiation message includes a target identifier and a call identifier and based on the call identifier, determining whether each session initiation message is an initial message or a redirected message. If the message is an initial message, then modifying the content of the initial message target identifier to generate a modified target identifier and returning to the initiating party a redirect message having the modified target identifier. Finally, forwarding each redirected message to a recipient associated with the modified target identifier.

In another embodiment, a method is provided which comprises receiving first messages from an initiating party. The first messages include a target string and a call string and based on the call string, identifying second messages from the one or more first messages. Creating a unique target string from the unique identification string and returning to the initiating party a third message having the unique target string for each message that is a second message associating at least one aspect of the target string with a unique identification string located in a data structure. Finally, forwarding the third messages having the unique target string to a recipient identified in the second message based on the association of the unique target string to the unique identification string in the data structure.

In still another embodiment, a method is provided for validating text-based protocol compliant multimedia sessions in a communications-networking environment. The method comprises receiving a set of first messages that include a target string and a call string and based on the call string, identifying a set of second messages from the set of first messages. Modifying characteristics of the target string to form a unique associated target string for each second message that is an initial message. Modifying the characteristics includes using the characteristics to create derived characteristics. Next, returning a third message having the associated target string. Finally, transmitting each first message having the associated target string.

In yet another embodiment, a method is provided for message validation in a network. The method comprises sending one or more text-based protocol messages that include a target string and a call string. Next, at an intermediary validation device, identifying initial session initiation messages from the sent messages. For each message that is an initial session initiation message, inserting characteristics into the target string to form an associated target string and returning a redirected session initiation message having the associated target string. Finally, at the intermediary validation point, passing initiation messages having the associated target string to a recipient identified in the target string of the initial session initiation message.

In one more embodiment, a validation system is provided for use in data communication networks supporting text-based protocol. The system comprises a terminal endpoint device in communication with an initiating endpoint device. Also, the system includes an intermediary component coupled to the terminal endpoint and authenticates communication from the initiating endpoint to the terminal endpoint.

BRIEF DESCRIPTION OF THE SEVERAL VIEWS OF THE DRAWINGS

The present invention is described in detail below with reference to the attached drawing figures, which are incorporated by reference herein and wherein:

FIGS. 1A-1E are exemplary embodiments of communications paths;

FIG. 5 illustrates exemplary embodiments of multiple header fields in relation to FIG. 4;

FIGS. 7-13 illustrate several exemplary embodiments for generating a properly encoded message according to step 618 of FIG. 6.

DETAILED DESCRIPTION OF THE INVENTION

Figure 2A:
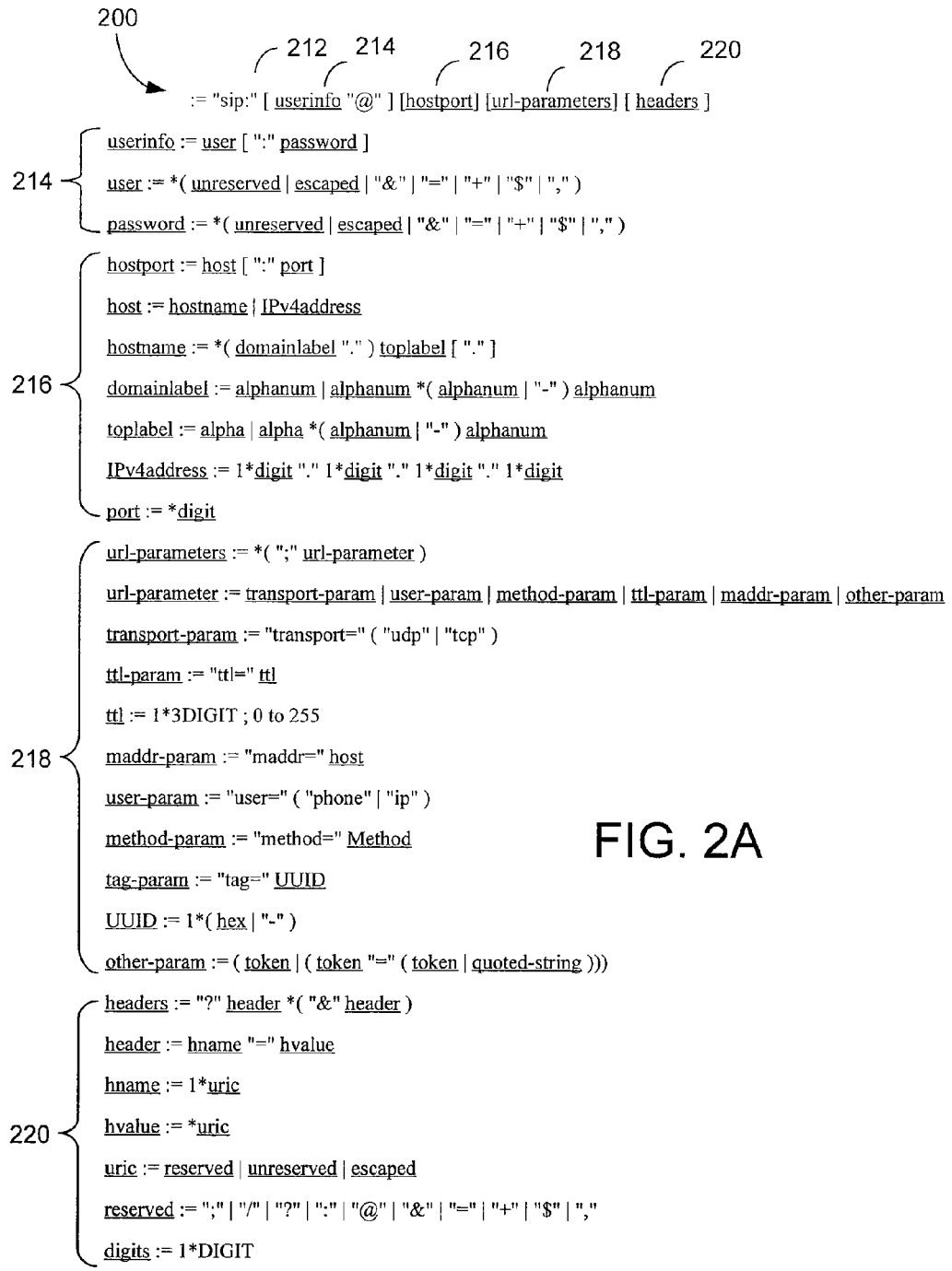
FIGS. 2A and 2B illustrates exemplary embodiments of a request line.

The present invention provides a system and method for validating SESSION INITIATION PROTOCOL messages (SIP) through the use of a novel validation method. In embodiments of the present invention, validation may incorporate modifying or amending properties in a SIP message to generate a unique validation characteristic. This characteristic may be used to access the legitimacy of the message to prevent hostile attacks, such as a DOS attack, directed toward a recipient or recipients of the message.

Further, embodiments of the present invention may be used in connection with various protocols, including text-based protocols, such as SIP, MGCP (Media Gateway Control Protocol), and NCS (Network based Call Signaling). However, to avoid obscuring various aspects of the present invention, reference will predominantly be made to SIP, but one skilled in the art would readily appreciate the applicability of the matters discussed herein to various other protocol environments. In addition, embodiments of the present invention may be used in connection with any type of data transfer, including, but not limited to voice, video, and instant messaging data.

Throughout this description, various technical terms are used. A definition of such terms can be found in Newton's Telecom Dictionary by H. Newton, 20th Edition (2004). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or its related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently. Combinations of the above are included within the scope of computer-readable media.

SIP can be used in communication sessions using, for example, VoP and instant-messaging (IM) applications. A user located at either an initiating or receiving endpoint may be termed a user agent (UA). A UA comprises a user agent client (UAC), which generates requests and a user agent server (UAS) which responds to requests. As used herein, a UA comprises both a UAC and a UAS. SIP doesn't define what a session is, but rather is concerned with the initiation, modification, and termination of a session. Initiating a session requires determining where the recipient UA is actually residing at the particular moment. A user may have a PC at work, a PC at home, and an IP phone at a lab. Once the recipient UA has been located, SIP delivers a description of the session to which the recipient UA is invited. SIP itself does not know the details of the session, however, SIP does convey information about the protocol used to describe the session. SIP does this through the use of Multipurpose Internet Mail Extensions (MIME), widely used in web and e-mail services to describe content (HTML, audio, video, etc.). The most common protocol used to describe sessions is the Session Description Protocol (SDP), described in request for comments (RFC) 2327 published by the Internet Engineering Task Force (IETF) and incorporated herein by reference. Although references will be made to various RFCs promulgated by the IETF relating to SIP, the present invention should not be construed as limited to the standards described therein or to any particular standards body such as the IETF. For example, the International Telecommunications Union (ITU) may promulgate standards regarding the use of SIP in VoP applications.

SIP is based on a request-response paradigm, and is described in further detail in RFC 3261, incorporated herein by reference. Exemplary communication paths illustrating SIP sessions are described in greater detail in FIGS. 1A-1E. SIP sessions comprise a series of requests, which include header fields and a request line. Header fields comprise "To," "From," "Cseq," "Call-ID," "Contact," and "Via" fields, which will be described in greater detail in relation to FIG. 5. Request lines comprise a method (SIP, HTTP, MGCP "Media Gateway Control Protocol," etc.) and request address. Request lines may, in some embodiments, be termed a target or destination string. Methods and request addresses are described in RFC 3261 as well as RFC 2396, incorporated herein by reference. Furthermore, request addresses may be referred to in the art as either a universal resource locator (URL) or a universal resource indicator (URI). As used herein, URI and URL refer to a request address. In addition, request addresses may be referred to as strings or identifiers. An exemplary format for a request address is discussed in further detail in relation to FIGS. 2A and 2B. Embodiments of the present invention may use the request address for validation to prevent malicious attacks directed toward a recipient or recipients. Exemplary embodiments will be discussed in greater detail in FIGS. 4 and 6-13. Embodiments of systems incorporating the present invention will be discussed in relation to FIG. 3.

Exemplary Communications Paths

FIGS. 1A-1E are exemplary embodiments of communications paths that may be utilized during SIP-initiated sessions. The communications paths may utilize both circuit-switched and packet-switched communications mediums. Referring now to FIG. 1A, there is illustrated one embodiment of a communications path 100. A session is initiated by UAs 110 and 112 at end point 1 to a UA 120 at end point 2. Although three UAs are shown in FIG. 1A, multiple UAs may reside at end points 1 and 2. UAs 110 and 112 communicate with UA 120 through a proxy server 114 and a proxy server 118. In this embodiment, communications between UAs at end point 1 and end point 2 take place through a network 116 communications medium, as in, for example, a VoP call using the Internet. Furthermore, as illustrated in the embodiment of FIG. 1B, communications between UAs 110 and 112 and 120 may be routed through an additional proxy server 122. Although one additional proxy server 122 is illustrated in FIG. 1B, communications between UAs 110, 112, and 120 may be routed through more than one additional proxy server 122.

Referring to yet another embodiment of a communications path 104 illustrated in FIG. 1C, UAs 110, 112, and 120 communicate through a substantially similar communications path 104 to that illustrated in FIG. 1A. Communications path 104 differs from communications path 100 in the use of session border controllers (SBC) 126 and 128 that may be located before proxy servers 114 and 118. An SBC is an interface to a network firewall that facilitates a secure handoff of voice packets from one network to another network. Further, an SBC controls the communication session as it crosses the border from one network to another. Conventional firewalls secure data streams, but for IP networks, SBCs facilitate secure, real time, multimedia communication. In an alternative embodiment, a VoP-aware firewall may be used instead of an SBC.

Another exemplary embodiment of a communications path 106 is shown in FIG. 1D. Path 106 may be a session between UAs 110, 112 and 120 through network communications medium 116 and a publicly switched telephone network (PSTN) communications medium 132. A session is initiated by UAs 110 and 112 through the Internet to a UA 120 having a plain old telephone (POT). A softswitch 130 is used to hand-off a call from network 116 to PSTN 132. Softswitches are call-control processing devices that can receive call requests for users and assign connections directly between communication devices. Softswitches set up the connections; they do not actually transfer the call data. Softswitches were developed to replace existing end office (EO) switches that have limited interconnection capabilities and to transfer the communication path connections from dedicated high-capacity lines to other more efficient packet networks (such as packet data on the Internet). This allows a single softswitch to operate anywhere without the need to be connected to high-capacity trunk connections. In FIG. 1D, the session proceeds through a central office (CO) 134 to UA 120. An embodiment of communications path 108, shown in FIG. 1E, illustrates the reverse of FIG. 1D in that UAs 110 and 112 initiate a session through PSTN 132 to UA 120 coupled to network 116.

Request Lines

Figures 2B, 3:
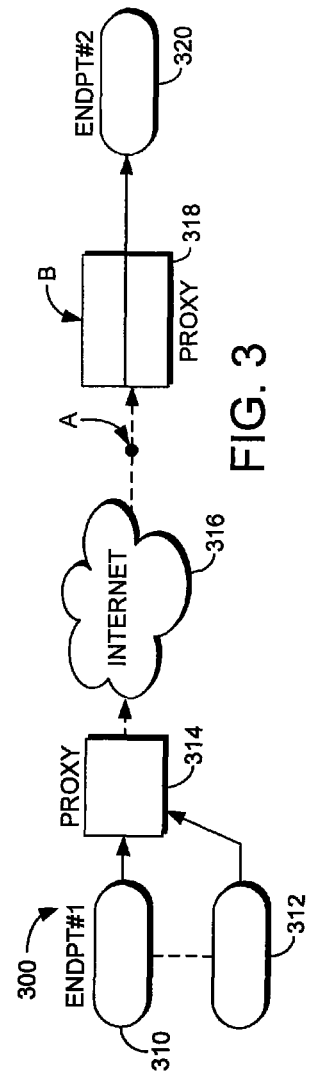
FIG. 3 illustrates an embodiment of a communications path of the present invention illustrating placement of an intermediary device for validation of messages.

An exemplary embodiment of a SIP request line 200 is illustrated in FIG. 2A. Line 200 comprises a method field 212; a request address 210, which may include a user-information field 214; a host field 216; a parameters field 218; and a headers field 220. The scope of the present invention is not, however, limited to the aforementioned fields. SIP is extensible and, thus, other fields not herein enumerated may be included within the scope of the invention. SIP protocol is indicated in method field 212. Further, user-information field 214 comprises user-identifier of a particular UA being addressed and a password string separated by a colon. As used in the art, user-information field 214 terminates with "@." Exemplary user-information fields 214 are shown in FIG. 2B and include destination addresses resembling e-mail addresses or destination addresses resembling telephone numbers. When a telephone number is used as a destination address in the user-information field 214, the parameters field 218 comprises a user-parameter string "user=phone." Host field 216 may comprise a host and a port string separated by a colon. The host string is commonly the domain or location of the recipient. The domain may comprise a domain label and a top label. In addition, the domain may comprise a numeric IPv4 or Ipv6 address. For example, in FIG. 2B, exemplary host field 218 would be big.com or proxy.big.com or 10.1.2.3. The port string is the port number of the domain to which the request of request line 200 is to be sent.

Still Referring to FIG. 2A, request address 200 further includes parameters field 218, which comprises any number of parameter strings such as a transport parameter string, user parameter string, method parameter string, TTL parameter string, and maddr parameter string. As used in the art, parameter field 218 is proceeded by a semicolon. Transport parameter strings denote the transport mechanism to be used for sending a SIP messages. Exemplary transport string include UDP and TCP. As previously discussed, if a telephone number is used as the destination address, the user parameter string comprises "user=phone." Furthermore, maddr parameter strings indicate a server address to be contacted for a particular UA identified in the user-information field 214, overriding the domain address located in the host field 216. TTL parameter strings determine the time-to-live value of a UDP multicast packet and may be limited in use in a situation where the maddr parameter is a multicast address and the transport parameter is UDP.

Request address 200 may further include the headers field 220, which comprises an hname and hvalue string, separated by "=". For example, if the hname is "body," then the associated hvalue string is the message body of the request and if the hname is "subject," the associated hvalue string is the subject of the request, such as "project." As used in the art, headers field 220 are preceded by "?". Exemplary headers fields 214 are shown in FIG. 2A.

Header Fields

Figure 4:
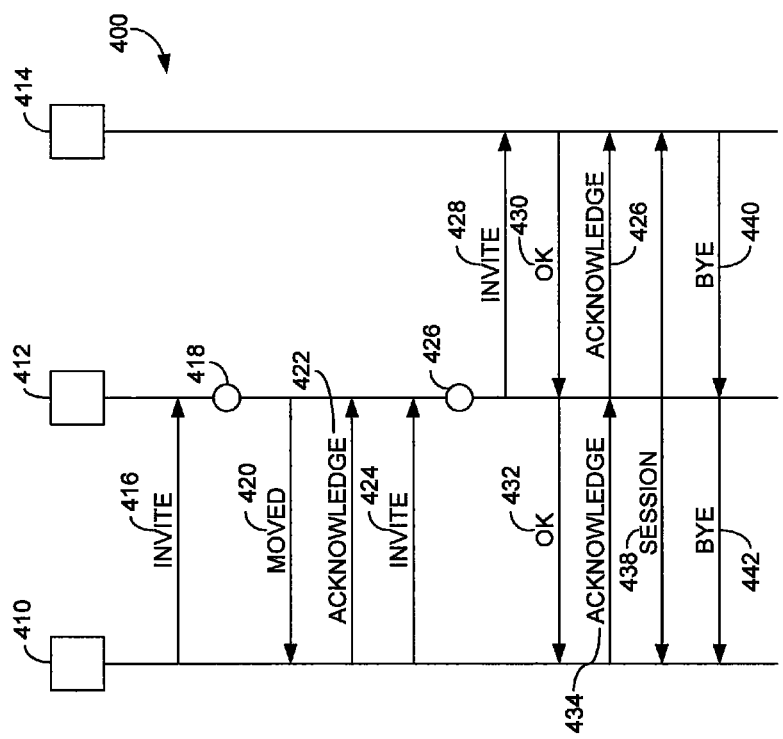
FIG. 4 illustrates an overview of an embodiment of a method for validating incoming messages.

FIG. 5 illustrates exemplary embodiments of multiple header fields. As will be discussed below, FIG. 5 further expands on an embodiment of a method of the invention illustrated in FIG. 4. An exemplary header field for step 416 of FIG. 4 is provided to introduce common header fields and will be referenced as header field 416. Header field 416 comprises a request line 416a, a "To" field 416b, a "From" field 416c, a "CSeq" field 416d, a "Call-ID" field 416e, a "Max-Forwards" field 416f, a "Via" field 416g, and a "Contact" field 416h. "To" field 416b comprises the address of the recipient of the request and may generally be equivalent to the request address of request line 416a described in greater detail hereinabove. "From" field 416c comprises the address of the initiator or sender of the request and is used by SIP elements to determine which processing rules to apply, such as whether or not to automatically reject the incoming request. "CSeq" field 416d identifies and orders transactions and may provide sequence data and method data. Method data generally matches that of request line 416a and sequence data generally comprises a 32-bit unsigned integer. "Call-ID" field 416e comprises a unique identifier to group together a series of messages. The unique identifier should be the same for all requests and responses sent during a session. "Max-Forwards" field 416f comprises a data value that limits the number of hops a message may transit during its sojourn to its destination. The data value is decremented by one at each hop. If the data value is zero, the message may generate an error response and be rejected at its destination. "Via" field 416g comprises a data value indicating the transport used for the session and the identity of the message's destination location. "Contact" field 416h provides a SIP request address that may be used to contact the initiating UA for subsequent requests. The forgoing fields comprise the most typical fields included in SIP header fields. However, other fields may be present and are described in further detail in RFC 3261.

Incorporated into request line 416a in header field 416 is a SIP INVITE request. SIP requests and responses comprise INVITE, MOVED, ACKnowledge (ACK), OK and BYE, each of which are described in greater detail in RFC 3261. Various embodiments of the present invention use, in particular, the INVITE and MOVED request and response. An INVITE request may be utilized by an initiating UA to initiate a session with the recipient UA designated in a request line. The recipient UA may either accept the request with an ACK response, or reject the request with, for example, a MOVED response. The MOVED response is similar in function to conventional call-forwarding and causes the initiating UA to reissue an INVITE request to the address of the recipient UA identified in the MOVED response. In a MOVED response to an INVITE request, the entire request address from the INVITE request is incorporated into the request line of the MOVED response. Some embodiments of the present invention may utilize the INVITE request and MOVED response to prevent malicious attacks. Although the INVITE request and MOVED response are utilized, the present invention should not be construed as being limited to the aforementioned request and response. Embodiments of the present invention use SIP message validation for each incoming SIP message, and message validation should not be construed to be limited to INVITE messages. In the SIP request-response paradigm, the aforementioned fields, with the exception of "To" field 416b, should be equivalent for each session. Embodiments of the present invention utilize this nature of SIP to perform message validation.

Message Validation

Referring now to FIG. 3, there is illustrated an embodiment of a communications path 300 of the present invention illustrating placement of an intermediary device for validation of SIP messages at points A and B. Although the communications path 300 illustrated in FIG. 3 resembles the communications path 100 of FIG. 1A, the communications path of FIG. 3 may take the form of any of the communications paths described in FIGS. 1A through 1E. An intermediary point for validation of SIP-compliant messages may take the form of a software integrated in an existing device as in Proxy 318 at point B, a dedicated denial of service device (DOS) at point A, such as those manufactured by Riverhead (now Cisco)™, or a hardware component dedicated for the purpose of validation. Moreover, an embodiment of an intermediary validation component may comprise all or a combination of the integrated software and hardware components located at points A and B. An intermediary validation component according to an embodiment of the present invention should be positioned, either logically or physically, in a network arrangement (FIGS. 1A-1E) so as to receive messages incoming to a recipient UA.

Referring now to FIGS. 4 and 5 in combination, there is illustrated an overview of an embodiment of a method 400 for validating incoming SIP messages. Further detail regarding the present invention will be discussed in relation to FIGS. 6-13. Method 400 comprises an initiating UA 410, an intermediary validation point 412, and a recipient UA 414. As discussed in relation to FIG. 3, intermediary validation point 412 may be either integrated into an existing device or operate as a stand-alone device. At a step 416, initiating UA 410 sends an INVITE request to recipient UA 414 through a network. The syntax of an exemplary INVITE request is illustrated in FIG. 5 as INVITE request 416. The various fields that comprise INVITE request 416 have been described above.

At a step 418, intermediary validation component 412 receives the incoming INVITE request before the request reaches the recipient UA. At a step 420, intermediary validation component 412 amends the INVITE message's request address and incorporates the amended address into a MOVED message. At a step 420, the MOVED message is relayed to the initiating UA 410. The syntax of an exemplary MOVED message is illustrated in FIG. 5 as MOVED message 420. The various fields comprising MOVED message 420 are substantially similar to that of INVITE message 416, with the exception of "Contact" field 420h, which comprises the amended request address. In this embodiment, the parameters field of the request address has been amended with parameter string of "hash=JS74H2602JV82674J," and the port string of the host field has been deleted. When amending, inserting, or modifying a parameters field of the request line, an additional field must also be amended or modified. The additional field may be any or a combination of user-information, host or headers field of a request line. Upon receipt of the MOVED message, initiating UA 410 acknowledges receipt of the MOVED message with an ACK message at a step 422 and returns a reissued INVITE message at a step 424. An exemplary ACK message 422 and reissued INVITE message 424 are illustrated in FIG. 5. The reissued INVITE message comprises the amended address which was imbedded in "Contact" field 420h of MOVED message 420. At a step 426, intermediary point 412 receives the reissued INVITE message and if the amended address is present, the reissued invite message is forwarded to the recipient UA 414 at a step 428. At a step 430 the recipient UA accepts the reissued INVITE message by returning an "OK" message and at a step 434 the initiating UA 410 acknowledges initiation of the session with the "ACK" message. At a step 438, initiating UA 410 communicates with recipient UA 414, using, for example, RTP. The session at step 438 is terminated at steps 440 and 442 with a "BYE" message.

Figure 6:
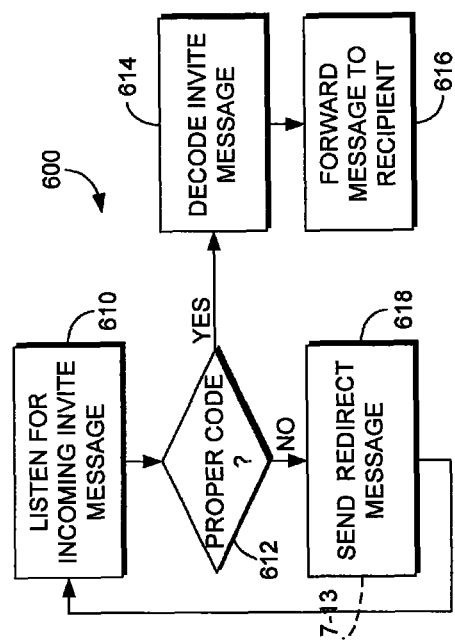
FIG. 6 illustrates a block diagram of an embodiment of a method for validating messages.
Figure 9:
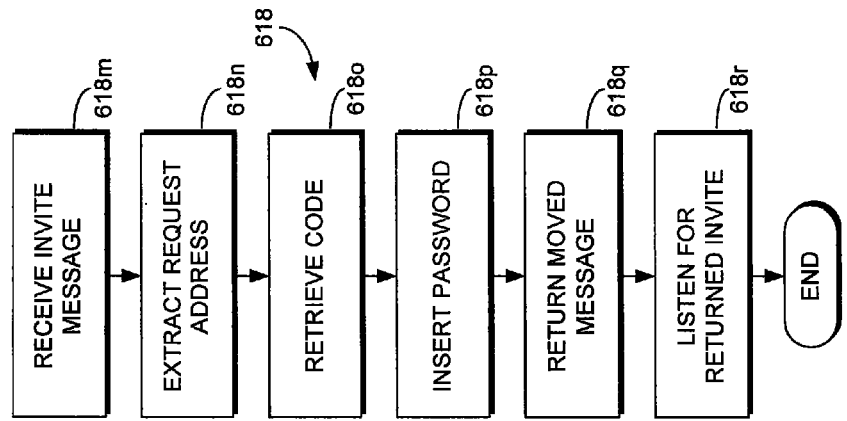
Figure 8:
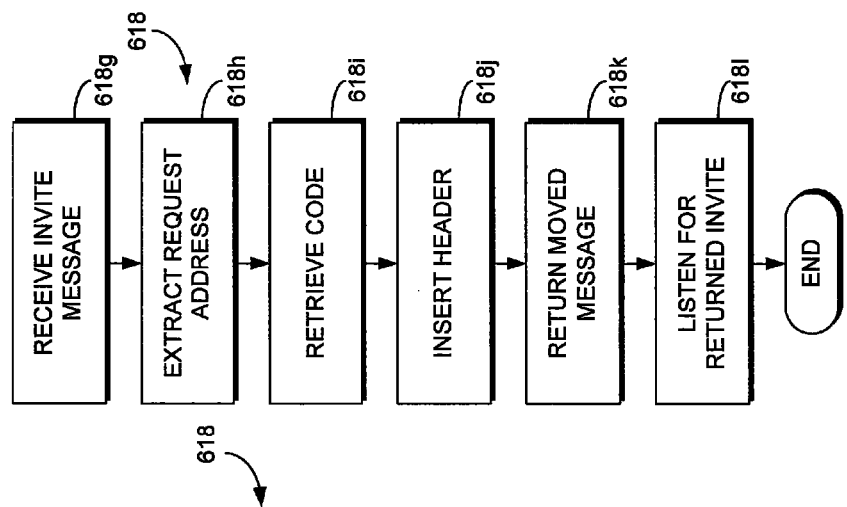
Figure 7:
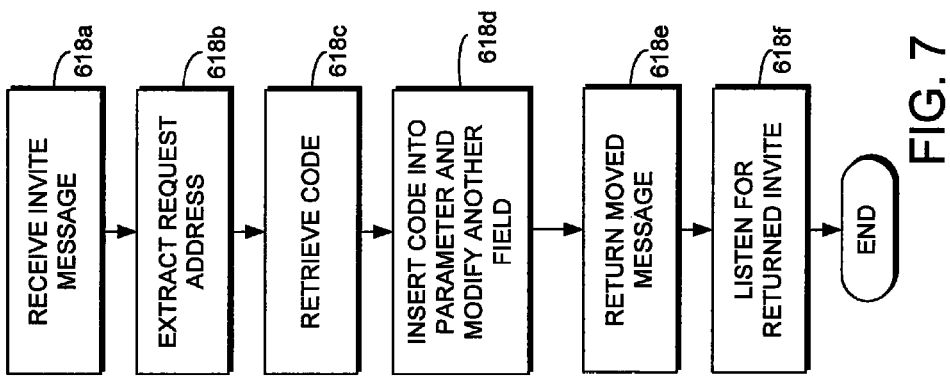

Turning now to FIG. 6, there is illustrated a block diagram of an embodiment of a method 600 for validating SIP messages. At a step 610, an intermediary validation component awaits an incoming SIP message from an initiating UA. After receipt of an incoming SIP message, the intermediary validation component determines if the message is properly encoded at a step 612. In some embodiments, an intermediary validation component determines whether the message is properly encoded by accessing a data structure comprising relational data between a characteristic of an initial INVITE message and a code (also termed a hash). The relational data may be based on, for example, the "Call-ID," "From," or "Cseq" fields of a header field of an initial INVITE message. However, the relational data may be based on any characteristic capable of linking a set of messages pertaining to a particular call. Furthermore, the data structure may comprise either a database, server, look-up table, workstation, or any other data storage device. Moreover, a code may be either unique to a particular call or, in other embodiments, be used more than once. Continuing with step 612, if the incoming SIP message comprises the proper encoding, the intermediary validation component decodes the message at a step 614 based on the relational data in the data structure. The message is then forwarded to a recipient UA at a step 616.

Referring still to FIG. 6 and, in particular, step 612. If the proper code is not found in the message, in one embodiment the intermediary validation component encodes the message at a step 618 and requests the initiating UA to return a properly encoded message. Exemplary embodiments for encoding are illustrated in FIGS. 7-13. In general, encoding comprises modifying or amending some aspect of an initial INVITE message in a manner so as to validate subsequent messages stemming from the initial INVITE message based upon the amendment or modification.

Referring now to FIGS. 7-13 in combination, there is illustrated several exemplary embodiments for generating a properly encoded message in step 618 of FIG. 6. FIGS. 7-10 illustrate various aspects of an embodiment in which a request address is amended with additional data (the hash). In other words, the additional data is added to a field having null data. Further, it is desirable that the additional data or hash does not conflict with predefined fields or strings commonly used in the request address. At a step 618a in FIG. 7, an INVITE message is received by the intermediary validation component from the initiating UA, and a request address is extracted from the message at a step 618b. A hash is derived at a step 618c and inserted into a parameters field of the extracted request address at a step 618d. In conjunction with the hash inserted into the parameters field at step 618d, another field such as a user-information, host, or headers field of the request address is amended or modified. A message having the hash in the initial request address is returned to the initiating UA at a step 618e. The intermediary validation component awaits a reissued INVITE request with the properly located hash at a step 618f. Similarly, in FIG. 8 a hash is derived and inserted into a parameters field at a step 618j. Likewise, in FIG. 9 a hash is derived and inserted into a user-information field at a step 618q and in FIG. 10, a hash is derived for either each parameter and header field or both and inserted therein at a step 618v.

Figure 11:
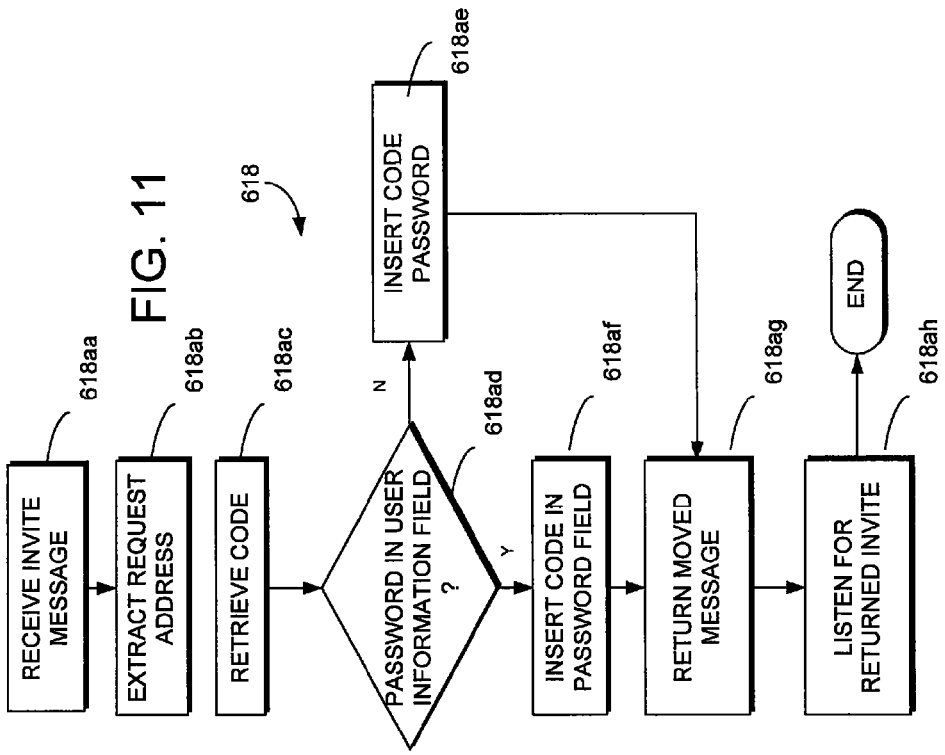
Figure 10:
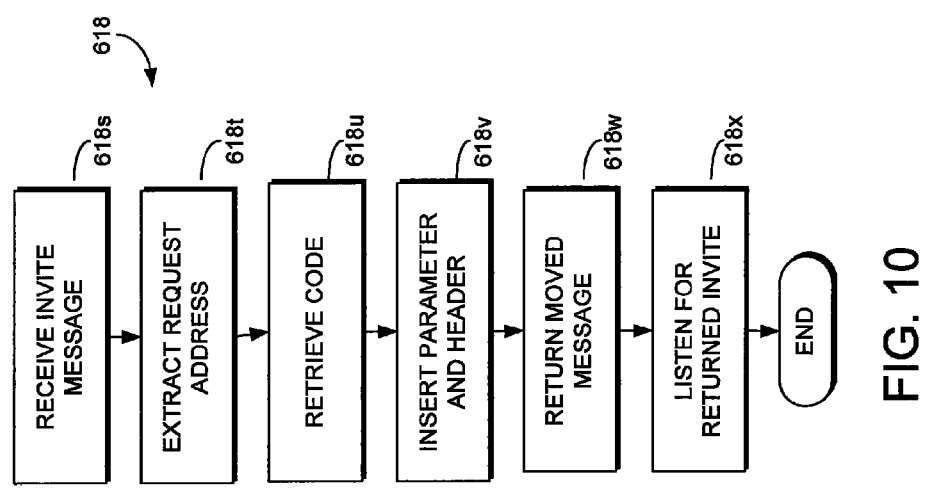

Continuing with reference to FIGS. 7-13 in combination, FIGS. 11-13 illustrate various aspects of an embodiment in which a request address is modified with additional data. FIG. 11 illustrates a modification of a password string of a user-information field of a request address at a step 618*ae*. FIG. 12 illustrates a modification of a host field of a request address at a step 618*al*. In FIG. 12 the initiating UA reissues an INVITE message to a new host. After receiving the reissued INVITE message with the new host in the request address, the intermediary validation component of FIG. 6 may forward the message through the new host. In another embodiment, the intermediary validation component may access the data structure comprising the relational data and forward the message to the original host. In FIG. 13, at a step 618*ar*, a user-information field of a request address is modified by a hash and returned to the initiating UA at a step 618 as. The intermediary validation component at step 612 in FIG. 6 accesses the relational database to determine the original user information upon receipt of a reissued INVITE request having the hash in the user-information field. At steps 614 and 616 the original user information is determined and the message is forwarded to the recipient UA.

As can be seen, the present invention and its equivalents are well-adapted to provide a new and useful method for SIP message validation. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A device that determines whether to allow a request to be communicated through a portion of a communications network that supports a text-based protocol, the device comprising:
a processor that receives a request sent from a sending device bound for a destination device and determines that the request is a legitimate request when the request includes a modification of a destination address of the destination device, and otherwise determines that the request is not legitimate, forwards the request to the destination device when the request is determined legitimate, and, when the request is determined not legitimate, requests the sending device to send another request that includes the modification of the destination address, wherein the modification of the destination address comprises a hash value derived from the destination address.

2. The device of claim 1, wherein the request is a request to connect to the destination device.

3. The device of claim 1, wherein the destination address includes a telephone number.

4. The device of claim 1, wherein the device is integrated into one or more communications device coupled to the destination device.

5. The device of claim 1, wherein the device exists in the communications network as one or more discrete device in communication with the destination device.

6. the device of claim 5, wherein the one or more discrete device is a proxy server.

7. The device of claim 1, wherein the device is integrated into one or more dedicated denial-of-service device in communication with the destination device.

8. A method for validating a request to initiate communication with a destination device in a communications network that supports text-based protocol, comprising:
receiving an initiation message from an initiating device;
determining that the initiation message is validated when the initiation message is properly encoded, and otherwise determining that the initiation message is not validated, wherein determining that the initiation message is validated when the initiation message is properly encoded comprises determining that the initiation message is validated when the initiation message includes a modification of a destination address of the destination device, wherein the modification of the destination address comprises a hash value derived from the destination address;
forwarding the initiation message to the destination device when the initiation message is validated; and
requesting the initiating device to send another initiation message that is properly encoded when the initiation message is not validated.

9. The method of claim 8, further comprising determining that the initiation message is properly encoded by accessing a data structure that includes relational data between the aspect of the initiation message and the code.

10. A computer apparatus to validate an initiation message that is destined for a destination device in a communications network that supports text-based protocol, the apparatus comprising:
software instructions configured, when executed by a computer system, to direct the computer system to receive at a validation device the initiation message from an initiating device that initiates communication with the destination device;
determine whether the initiation message includes a modified address that is based on a destination address of the destination device, wherein the modified address comprises a hash value associated with the destination address;
when the initiation message includes the modified address, forward the initiation message to the destination device; and
when the initiation message does not include the modified address, request the initiating device to send another initiation message that contains the modified address; and
at least one non-transitory computer-readable storage medium storing the software instructions.

11. The apparatus of claim 10, wherein the software instructions configured to direct the computer system to determine whether the initiation message includes the modified address comprises the software instructions configured to direct the computer system to access a data structure that includes relational data between the destination address and the code.

12. The apparatus of claim 10, wherein the text-based protocol includes one or more of:

a version of the SESSION INITIATION PROTOCOL (SIP),
a version of the NCS protocol,
a version of MGCP, and
combinations thereof.

13. The apparatus of claim 12, wherein the initiation message is a request to initiate a communication session with the destination device.

14. The apparatus of claim 13, wherein the communication session includes communicating one or more of:
a voice data packet;
a video data packet;
an instant messaging data packet; and
combinations thereof.

* * * * *